United States Patent
Togo et al.

(10) Patent No.: US 11,294,751 B2
(45) Date of Patent: Apr. 5, 2022

(54) STORAGE APPARATUS, DUMP DATA MANAGEMENT METHOD, AND DUMP DATA MANAGEMENT PROGRAM

(71) Applicant: Hitachi, Ltd., Tokyo (JP)

(72) Inventors: Kazuki Togo, Tokyo (JP); Kazuei Hironaka, Tokyo (JP); Akira Deguchi, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/007,030

(22) Filed: Aug. 31, 2020

(65) Prior Publication Data

US 2021/0357286 A1 Nov. 18, 2021

(30) Foreign Application Priority Data

May 18, 2020 (JP) ................................ 2020-086573

(51) Int. Cl.
*G06F 11/00* (2006.01)
*G06F 11/07* (2006.01)
*G06F 11/30* (2006.01)
*G06F 11/14* (2006.01)

(52) U.S. Cl.
CPC ...... *G06F 11/0778* (2013.01); *G06F 11/0772* (2013.01); *G06F 11/1453* (2013.01); *G06F 11/3034* (2013.01); *G06F 11/3075* (2013.01)

(58) Field of Classification Search
CPC ............. G06F 11/0778; G06F 11/1453; G06F 11/0772; G06F 11/3034; G06F 11/3075
See application file for complete search history.

(56) References Cited

U.S. PATENT DOCUMENTS

| 9,753,806 B1* | 9/2017 | Glancy .................... G06F 11/14 |
| 2013/0152050 A1* | 6/2013 | Chang ................. G06F 11/0784 717/125 |
| 2014/0122932 A1* | 5/2014 | Chen .................... G06F 11/0706 714/37 |
| 2014/0304464 A1* | 10/2014 | Bert ....................... G06F 3/0611 711/105 |
| 2016/0055262 A1* | 2/2016 | Bhattacharjee ..... G06F 11/1453 707/722 |
| 2016/0070486 A1* | 3/2016 | Anderson ........... G06F 11/0778 711/103 |
| 2018/0322016 A1* | 11/2018 | Debata ................. G06F 11/1441 |
| 2020/0065179 A1* | 2/2020 | Niemeyer ............. G06F 3/0673 |

FOREIGN PATENT DOCUMENTS

JP 2006-190069 A 7/2006

* cited by examiner

*Primary Examiner* — Jonathan D Gibson
(74) *Attorney, Agent, or Firm* — Mattingly & Malur, PC

(57) ABSTRACT

Dump data of a memory is allowed to be easily and appropriately managed. In a storage apparatus including a CPU, a DRAM, and a drive, the CPU executes storage processing to store data of the DRAM to be stored into the drive as dump data upon a failure occurrence in the storage apparatus. The CPU deduplicates the dump data in the storage processing or after storing the dump data into the drive. The CPU may execute deduplication processing between the dump data and other dump data stored in the drive or may execute deduplication processing within the data to be stored.

6 Claims, 12 Drawing Sheets

LOGICAL VOLUME MANAGEMENT TABLE

| VOLUME ID (2101) | VOLUME CAPACITY (2102) | VOLUME TYPE (2103) | POOL ID (2104) |
|---|---|---|---|
| 1 | 100GB | R-VOL | |
| 2 | 150GB | P-VOL | 1 |
| 3 | 200GB | P-VOL | 2 |
| ... | ... | ... | ... |

FIG. 7

| FAILURE ID | DATE AND TIME OF FAILURE OCCURRENCE | FAILURE CODE |
|---|---|---|
| 1 | 2019/4/10 14:11 | 6E1B |
| 2 | 2019/5/2 17:05 | 7A4A |
| 3 | 2019/7/20 5:52 | 00BB |
| 4 | 2019/12/11 11:42 | 2D3C |
| ... | ... | ... |

FAILURE INFORMATION MANAGEMENT TABLE 4210
4211 4212 4213

FIG. 8

| DUMP DATA MANAGEMENT TABLE 4220 | | | |
|---|---|---|---|
| DUMP DATA ID 4221 | FAILURE ID 4222 | DATE AND TIME OF DUMP DATA ACQUISITION 4223 | STORAGE LOCATION LOGICAL VOLUME ID 4224 |
| 1 | 1 | 2019/4/10 14:11 | 105 |
| 2 | 2 | 2019/5/2 17:05 | 203 |
| 3 | 3 | 2019/7/20 5:52 | 250 |
| 4 | 4 | 2019/12/11 11:42 | 301 |
| ... | ... | ... | ... |

FIG. 9

DEDUPLICATION MANAGEMENT TABLE 4230

| ADDRESS OF LOGICAL DATA AREA 4231 | SIZE OF LOGICAL DATA AREA 4232 | STORAGE LOCATION DEDUPLICATION VOLUME ID 4233 |
|---|---|---|
| 0x00000000 | 8192 | 1000 |
| 0x00002000 | 8192 | 1001 |
| 0x00004000 | 8192 | 1002 |
| 0x00006000 | 8192 | 1003 |
| ... | ... | ... |

STORAGE APPARATUS, DUMP DATA MANAGEMENT METHOD, AND DUMP DATA MANAGEMENT PROGRAM

CROSS-REFERENCE TO RELATED APPLICATION

The present application claims priority from Japanese application JP 2020-086573, filed on May 18, 2020, the contents of which is hereby incorporated by reference into this application.

BACKGROUND

The present invention relates to a technique of managing dump data of a memory in a storage apparatus.

In a storage apparatus installed in a data center etc., a failure may occur due to software or hardware during operation. Upon a failure occurrence, analysis is executed to identify the failure location and a cause of the failure. In a maintenance upon the failure occurrence, a maintenance person may acquire memory data for software under execution in the storage apparatus into, e.g., an external storage by using a system dump function. Here, the content of the outputted memory data is called dump data.

A technique of copying information about a predetermined area of a main storage to a nonvolatile memory upon restart after the failure occurrence of an information processing system is disclosed (for example, Japanese Unexamined Patent Application Publication No. 2006-190069).

SUMMARY

For example, an enterprise storage apparatus requires high reliability and availability. Therefore, the vendor of the storage apparatus wishes to identify the cause of the failure occurrence in the storage apparatus of the customer.

However, the dump data of a storage apparatus usually used for failure analysis tends to be large in size. Therefore, to store dump data for many generations, there is a problem that a relatively large capacity storage area needs to be prepared for an apparatus that manages dump data.

Acquisition of dump data in a storage apparatus is executed by, for example, a maintenance person in many cases. The maintenance person needs to operate the target storage apparatus to acquire dump data of the storage apparatus. Immediate recovery of business is the most important for the customer using the storage apparatus. The dump data acquisition requiring maintenance operation is not important. It is difficult to acquire the dump data near the failure occurrence. This dump data is effective for failure analysis.

The present invention is made in view of the above situation. An object of the present invention is to provide a technique allowing easy and proper management of dump data of a memory portion.

To achieve the above object, a storage apparatus of one aspect includes a processor portion, a memory portion, and a storage device. The processor portion executes storage processing to store data of the memory portion to be stored to the storage device upon a failure occurrence in the storage apparatus. In the storage processing or after dump data is stored in the storage device, deduplication processing is executed to the dump data.

According to the present invention, dump data of a memory portion of a storage apparatus is easily and appropriately manageable.

BRIEF DESCRIPTION OF THE DRAWINGS

FIG. 4 is a configuration of an example of a logical volume management table of one embodiment;

FIG. 7 is a configuration of an example of a failure information management table of one embodiment;

FIG. 8 is a configuration of an example of a dump data management table of one embodiment;

FIG. 9 is a configuration of an example of a deduplication management table of one embodiment;

DETAILED DESCRIPTION

Embodiments are explained in reference to the drawings. The after-mentioned embodiments do not limit the invention of the range of claims. All various elements and all combinations of the elements described in the embodiments are not essential for the solutions of the invention.

Information about the embodiments is explained below using a term "table." The information does not necessarily need to be a table and may be a data configuration other than a table.

The following explanation may be made using a "program" as a main operating element. A program is executed by a processor (for example, a CPU (Central Processing Unit)) to execute predetermined processing using a storage resource (for example, a memory), a communication I/F, and a port. The following explanation may be therefore made using a processor as a main element for operation.

The processing explained using a program as a main component for operation may be executed by a computer (for example, a calculation host or a storage apparatus) having a processor.

A program may be installed from a program source (for example, a program distribution server or a storage medium readable by a computer (for example, a portable storage medium)) to each computer. In this case, the program distribution server includes a CPU and a storage resource. The storage resource stores a distributing program and a program to be distributed. The CPU executes the distributing program. Then, the CPU of the program distribution server distributes the program to be distributed to another computer. In the following explanation, multiple programs may be realized as one program or one program may be realized as multiple programs.

In the following explanation, an "interface portion" may include at least one of a user interface portion and a communication interface portion. The user interface portion may include at least one I/O device of one or more I/O devices (for example, an input device (for example, a keyboard or a pointing device) and an output device (for example, a display device)) and a display computer. The communication interface portion may include one or more communication interface devices. The one or more communication interface devices may be one or more same type communication interface devices (for example, one or more NICs (Network Interface Cards)). The one or more communication interface devices may be multiple different type communication interface devices (for example, an NIC and an HBA (Host Bus Adapter)).

In the following explanation, a "memory portion" include one or more memories. At least one memory may be a volatile memory or a nonvolatile memory. The memory portion is mainly used for processing by a processor portion.

<Entire Configuration of Storage System>

Figure 1:
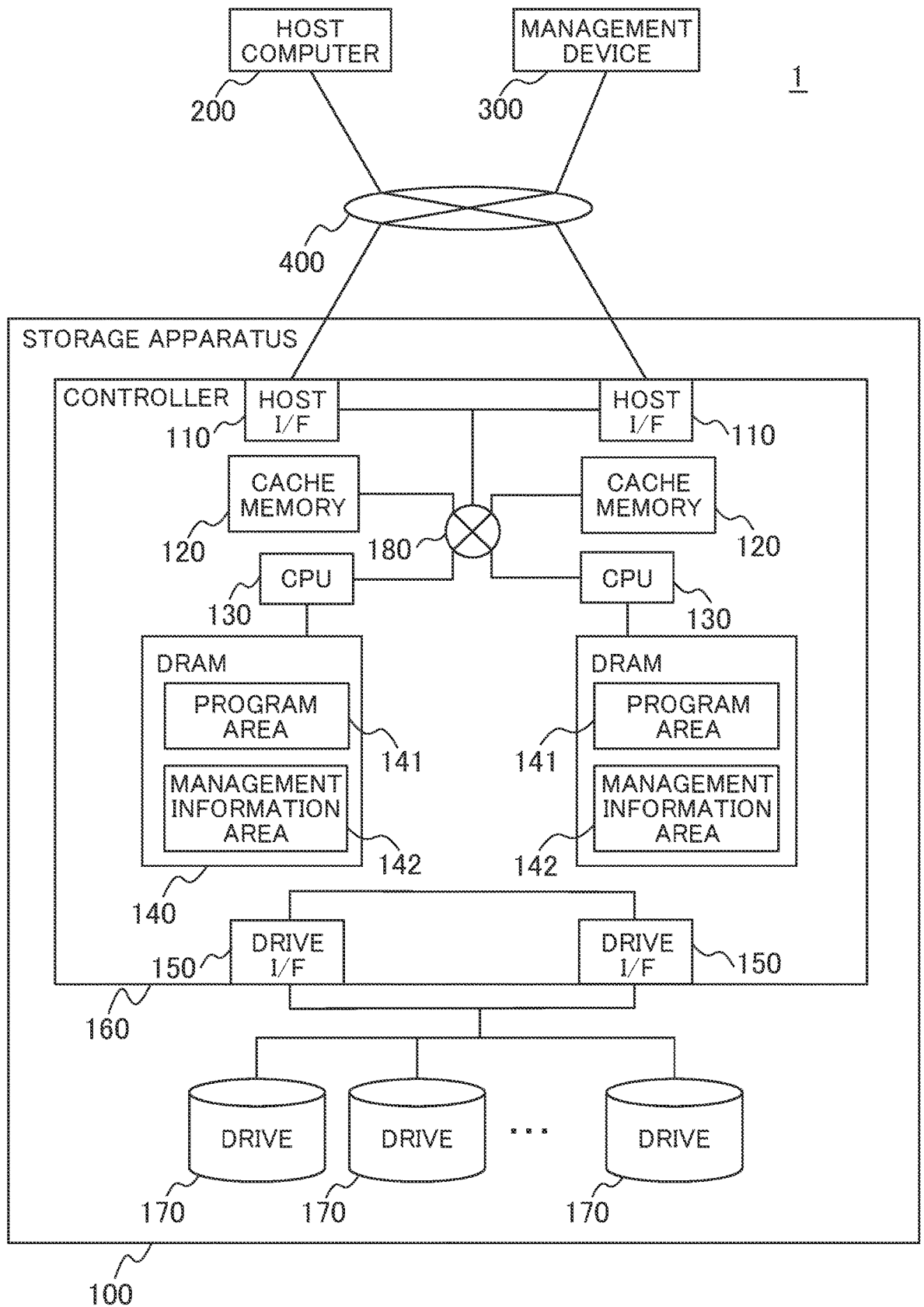
FIG. 1 is a configuration of an entire storage system of one embodiment.

FIG. 1 illustrates an entire configuration of a storage system of one embodiment.

A storage system 1 includes a storage apparatus 100, one or more host computers 200, and one or more management devices 300. The storage apparatus 100, host computers 200, and management devices 300 are connected via a network 400. The network 400 may be LAN (Local Area Network) or WAN (Wide Area Network).

The host computer 200 include a computer, a file server, etc. at the core of, for example, a work system. The host computer 200 requires the storage apparatus 100 to read/write data of works.

The management device 300 is a computer including hardware resources such as a processor, a memory, a network interface, and a local input output device and software resources such as a control program. The management device 300 acquires information from the storage apparatus 100 by a management program to display, for example, a management screen via the local input output device (such as a display). The management device 300 requests the storage apparatus 100 for various setting information inputted by a system management person via the management screen.

The storage apparatus 100 includes one or more drives 170 that store data and a controller 160 that controls the entire storage apparatus 100.

The drive 170 is a physical storage device. The drive 170 may be typically a nonvolatile storage device (for example, an auxiliary storage device). The drive 170 may be, for example, an HDD (Hard Disk Drive) or SSD (Solid State Drive). The storage apparatus 100 may include different types of the drives 170. The multiple drives 170 may be provided in the storage apparatus 100 to form RAID (Redundant Arrays of Inexpensive Disks). Thus, with the RAID using the multiple drives 170, the improvement in reliability by data redundancy, the improvement in performance by parallel operations of the drives 170, etc. are expectable.

The drives 170 that form the RAID are called a RAID group. The RAID group stores data based on a RAID level. The RAID group may be called a parity group. The parity group may be a RAID group that stores parities. In the following explanation, a volume stands for a logical volume and may be described as VOL. The volume may be a logical storage device.

The controller 160 includes a CPU 130 as an example of the processor portion, a DRAM (Dynamic Random Access Memory) 140 as an example of the memory portion, a cache memory 120, a host I/F 110 (host interface), a drive I/F 150 (drive interface), and a switch 180 that interconnects these components to each other. In the present embodiment, the controller 160 includes two groups of the components 110 to 150.

The CPU 130 controls the entire storage apparatus 100 based on the program and management information stored in the DRAM 140.

The DRAM 140 includes a program area 141 that stores a program executed by the CPU 130 (for example, an OS (Operating System), a dump data management program, etc.) and a management information area 142 that stores various management information referenced or updated by the CPU 130. In this embodiment, the management information area 142 stores, for example, a pool management table 2000 (see FIG. 3) and a logical volume management table 2100 (see FIG. 4).

The cache memory 120 holds the data to be written that is transmitted from the host computer 200 until the write target data is written to the drive 170. The cache memory 120 holds the data to be read that is read from the drive 170 in response to a read request from the host computer 200 until the data to be read is transmitted to the host computer 200.

The host I/F 110 communicates with other devices (the host computer 200, management device 300, etc.) via the network 400. The host I/F 110 may be called a frontend I/F.

The drive I/F 150 communicates with one or more drives 170. The drive I/F 150 may be called a backend I/F.

The CPU 130, DRAM 140, cache memory 120, host I/F 110, drive I/F 150, and switch 180 may be configured as one semiconductor device or may be configured by connecting multiple individual ICs (Integrated Circuit) to each other as ASIC (Application Specific Integrated Circuit) or FPGA (Area Programmable Gate Array).

<Logical Configuration of Storage Area Managed in Storage Apparatus>

Next, a logical configuration of a storage area of data managed in the storage apparatus 100 is explained.

Figure 2:
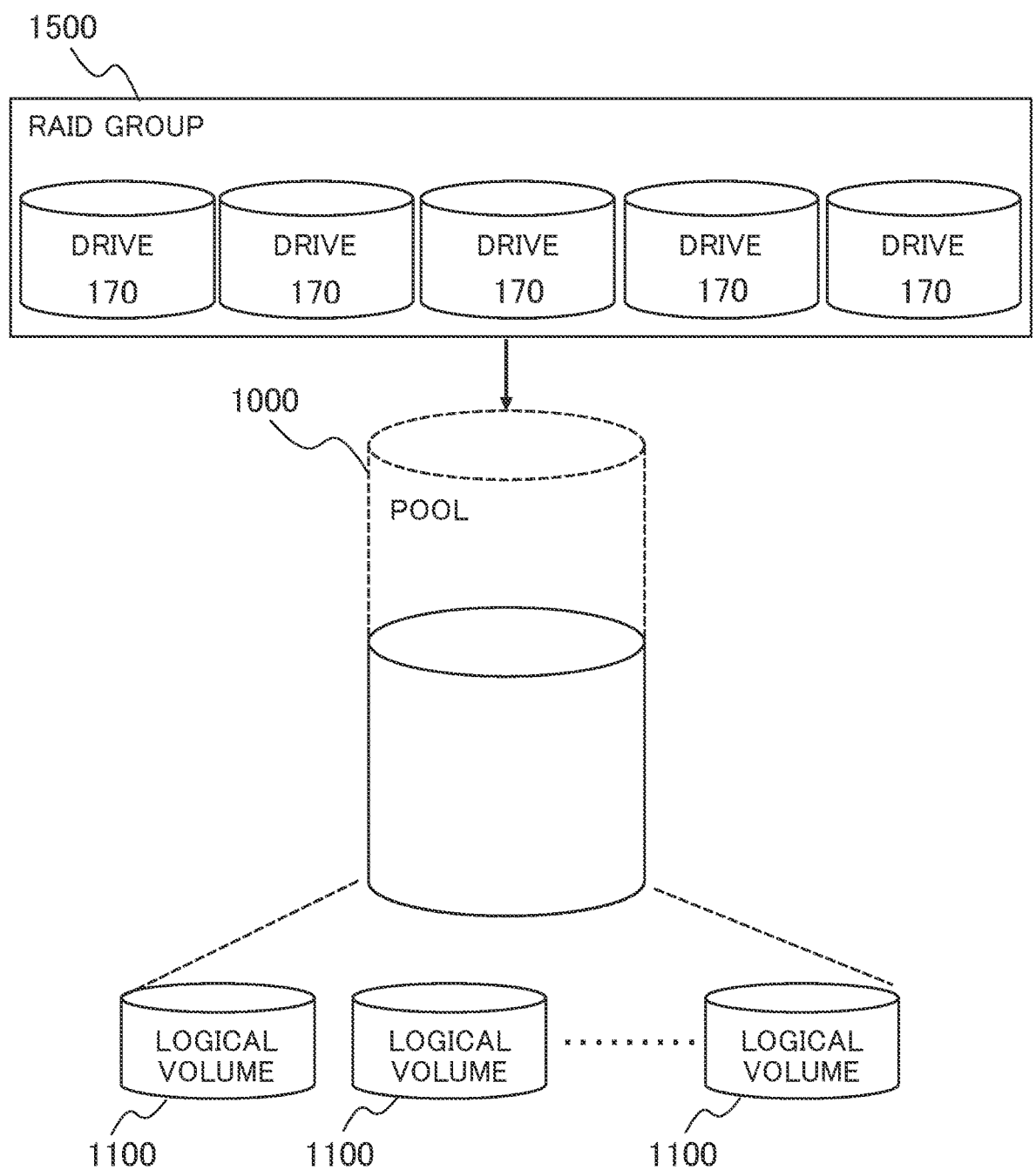
FIG. 2 illustrates a logical configuration of a storage area managed by a storage apparatus of one embodiment.

FIG. 2 illustrates a logical configuration of a storage area managed in a storage apparatus of one embodiment.

The storage apparatus 100 includes one or more pools 1000. The pool 1000 is a logical storage area based on one or more RAID groups 1500. The RAID group 1500 is a storage area based on storage areas of the multiple drives 170. The pool 1000 may be provided for each application. For example, at least one of a TP (Thin Provisioning) pool and a snapshot pool may be provided as the pool 1000.

The logical volumes 1100 are logical storage devices. The logical volumes 1100 may be based on physical storage resources (for example, one or more RAID groups 1500) of the storage apparatus 100 or on the pool 1000. The logical volumes 1100 may be in accordance with a capacity virtualization technology formed of multiple virtual storage areas (for example, TP pools).

Next, the pool management table 2000 that manages the pools 1000 is explained.

Figure 3:
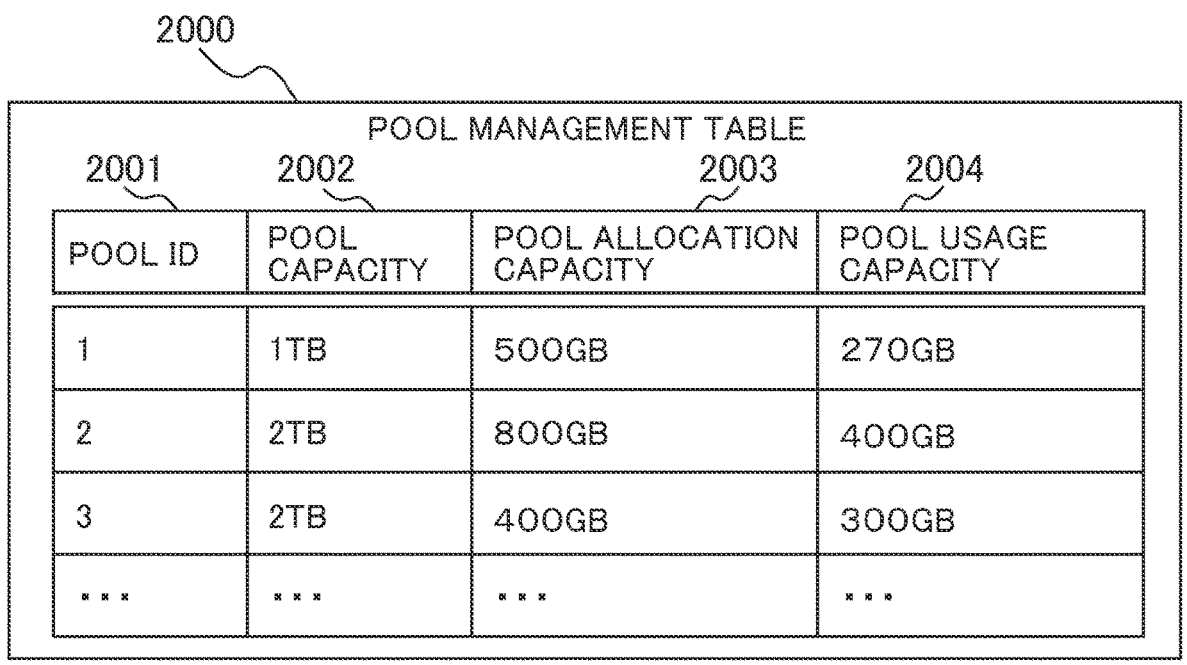
FIG. 3 is a configuration of an example of a pool management table of one embodiment.

FIG. 3 illustrates an example of a pool management table of one embodiment.

The pool management table 2000 stores an entry per each pool 1000. The entry of the pool management table 2000 includes fields of a pool ID 2001, a pool capacity 2002, a pool allocation capacity 2003, and a pool usage capacity 2004.

The pool ID 2001 stores an identification number (pool ID) of the pool 1000 corresponding to the entry. The pool ID is uniquely provided to each pool 1000 of the storage apparatus 100. The pool capacity 2002 stores a capacity defined in the pool 1000 corresponding to the entry. Specifically, the pool capacity 2002 stores a capacity responsive to a RAID level based on the capacity of the drives 170 that form one or more RAID groups 1500 that form the pool. The pool allocation capacity 2003 stores a capacity of the entire page group allocated from the pool 1000 corresponding to the entry to the logical volumes 1100. The pool usage capacity 2004 stores a total capacity of the data stored in the pool 1000 corresponding to the entry.

Next, the logical volume management table 2100 that manages the logical volume 1100 is explained.

FIG. 4 illustrates a configuration of an example of a logical volume management table of one embodiment.

The logical volume management table 2100 stores an entry per each logical volume 1100. The entry of the logical volume management table 2100 includes fields of a volume ID 2101, a volume capacity 2102, a volume type 2103, and a pool ID 2104.

The volume ID 2101 stores an identification number (volume ID) of the logical volume 1100 corresponding to the entry. The volume ID is uniquely provided to the logical volume 1100 of the storage apparatus 100. The volume capacity 2102 stores a capacity of the logical volume 1100 corresponding to the entry. The volume type 2103 stores a type of the logical volume 1100 corresponding to the entry. The type includes P-VOL to indicate that the volume is based on the pool 1000 or R-VOL to indicate that the volume is based on the volume RAID group 1500. The pool ID 2104 stores the Pool ID of the pool 1000 on which the logical volume 1100 corresponding to the entry is based, that is, the Pool ID of the pool 1000 that provides a storage area to the logical volume 1100. This pool ID allows identification of the entry of the corresponding pool in the pool management table 2000.

<Processing Outline upon Failure in Storage System>

Next, a processing outline upon a failure in the storage system 1 is explained.

Figure 5:
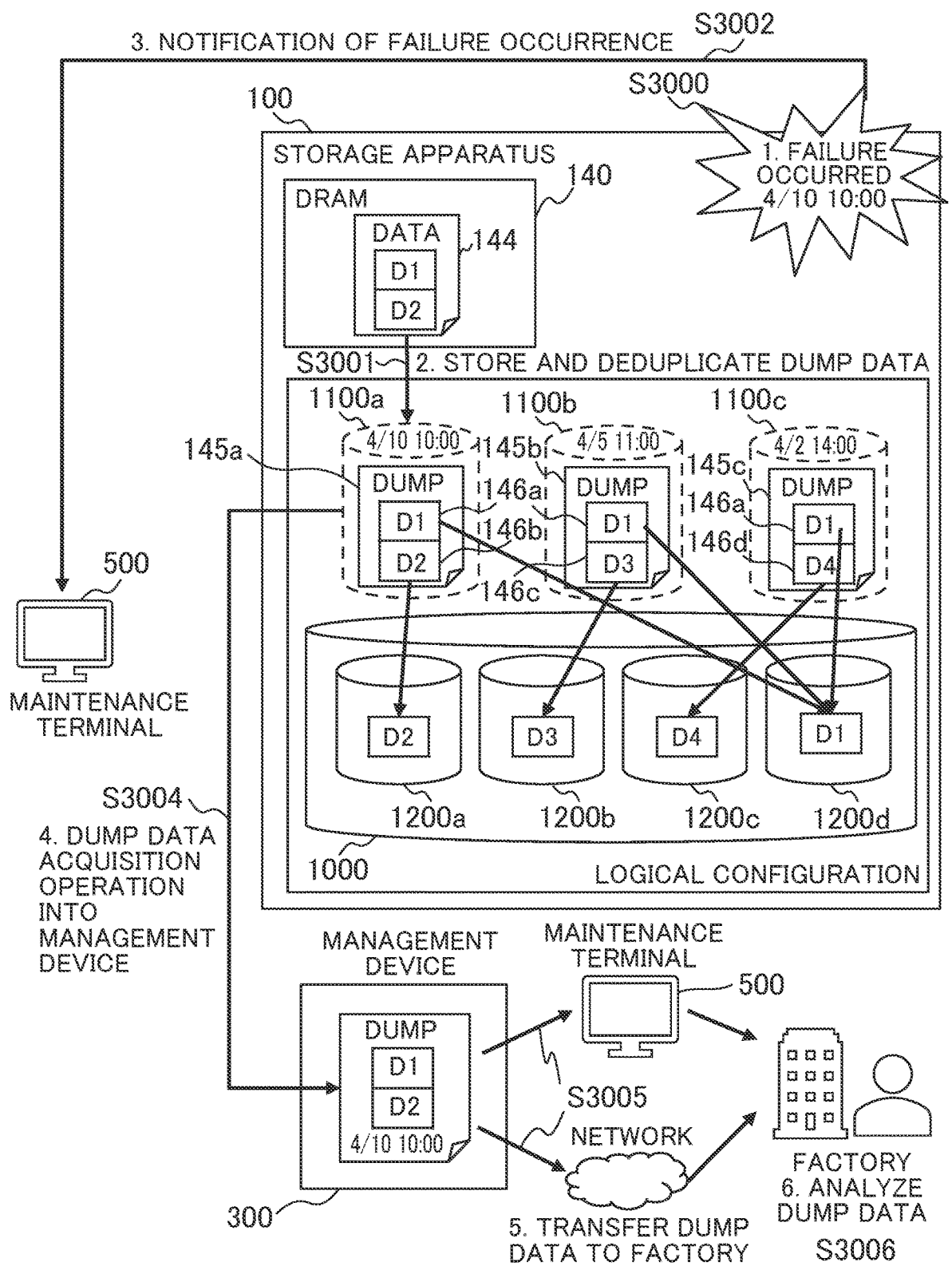
FIG. 5 illustrates an outline of dump data management processing of a storage system of one embodiment.

FIG. 5 illustrates dump data management processing in the storage system of one embodiment.

The dump data management processing upon a failure in the storage system 1 uses, for example, the storage apparatus 100, the management device 300, and a maintenance terminal 500. The maintenance terminal 500 is used by a maintenance person and may include, for example, a general purpose computer.

The storage apparatus 100 has a dump function that dumps (outputs) data on the DRAM 140 and a deduplication function that executes deduplication processing of data in the logical volumes. Here, dumped (outputted) data of memory data 144 on an area where a dump output is to be executed (dump output target area) upon a failure occurrence such as the program stack when programs of the management information area 142 and program area 141 on the DRAM 140 are executed is called dump data 145 (Dump).

The storage apparatus 100 has, as a logical configuration, the logical volumes 1100 (1100a, 1100b, 1100c, etc.) storing the dump data 145 (145a, 145b, 145c, etc.) and deduplication volumes 1200 (1200a, 1200b, 1200c, 1200d, etc.) storing deduplicated data, and the pool 1000 that is a basis of the deduplication volumes 1200.

Before the failure occurrence, the logical volume 1100b stores the dump data 145b stored in the past and the logical volume 1100c stores the dump data 145c stored in the past. The dump data 145b includes a data unit 146a (data unit D1) and a data unit 146c (data unit D3). The dump data 145c includes the data unit 146a (data unit D1) and a data unit 146d (data unit D4). The dump data 145b and dump data 145c have been already deduplicated. Only one of the data units D1 that overlap between the dump data 145b and dump data 145c is stored in the deduplication volume 1200d. The data unit D1 of the deduplication volume 1200d is referenced from both the dump data 145b and dump data 145c. The data unit D3 that is not duplicate between the dump data 145b and dump data 145c is stored in the deduplication volume 1200b and referenced. The data unit D4 is stored in the deduplication volume 1200c and referenced.

The processing when a failure occurs in the storage apparatus 100 in such a situation is explained below.

The storage apparatus 100 detects a failure when the failure occurs in hardware or software of the storage apparatus 100 (Step S3000).

When detecting the failure, the storage apparatus 100 stores the memory data 144 of the dump output target area on the DRAM 140 upon the failure occurrence onto the logical volume 1100a as the dump data 145a. The dump data 145a at this time includes the data unit D1 and data unit D2. Next, the storage apparatus 100 deduplicates data between the dump data 145a and the dump data 145b, 145c stored in the past (S3001). As a result, the data unit D1 of the dump data 145a overlaps the data units D1 of the dump data 145b and 145c stored in the past, and therefore, the storage apparatus 100 does not store the data unit D1 onto the deduplication volume 1200 but maps the data unit D1 to the deduplication volume 1200d. The data unit D2 of the dump data 145a does not overlap the data units of the dump data 145b and 145c stored in the past. Therefore, the storage apparatus 100 newly creates a deduplication volume 1200a and stores the data unit D2 onto the deduplication volume 1200a. Consequently, the data units overlapping the past dump data are prevented from overlapping in the pool 1000, and the usage capacity of the pool 1000 can be thus reduced.

Next, the storage apparatus 100 notifies the maintenance terminal 500 of the failure occurrence (S3002). In the notification of the failure occurrence, the storage apparatus 100 transmits information such as the time of the failure occurrence and the failure code indicating the occurred failure to the maintenance terminal 500.

Thus, the maintenance terminal 500 receives the notification of the failure occurrence to display the notification. A maintenance person can recognize the failure occurrence from the maintenance terminal 500. Then, when the maintenance person operates the management device 300 to transfer the dump data upon the failure occurrence to a predetermined device (the maintenance terminal 500 or an information processing device of a factory), the management device 300 transmits a transfer request corresponding to the transfer operation to the storage apparatus 100. The storage apparatus 100 identifies the dump data 145a specified by the transfer request and transfers the dump data 145a to the management device 300 (S3004). Specifically, the storage apparatus 100 that has received the transfer request for the dump data from the management device 300 identifies the dump data 145a corresponding to the transfer request. The storage apparatus 100 acquires the data unit D1 of the dump data 145a from the deduplication volume 1200d and acquires the data unit D2 from the deduplication volume 1200a. The storage apparatus 100 transmits the data unit D1 and data unit D2 to the management device 300. The transfer of the dump data using the management device 300 has been illustrated. Dump data may be transferred directly to the storage apparatus 100. When analysis of a failure also requires the past dump data 145b and 145c, the storage apparatus 100 may transmit the dump data 145b and 145c to the management device 300.

Then, the dump data 145a transmitted to the management device 300 is transported to the information processing device for analysis in a place for analysis (for example, a factory). In this case, the management device 300 may store the acquired dump data 145*a* to the maintenance terminal 500 and transport the maintenance terminal 500 to the factory. Then, the dump data 145*a* may be transported to the information processing terminal for analysis. Alternatively, the dump data 145*a* may be transported from the management device 300 to the information processing terminal for analysis via the network (S3005).

Then, the information processing device of the factory analyzes the acquired dump data 145*a* (S3006).

Next, a logical configuration of the storage apparatus 100 is explained.

Figure 6:
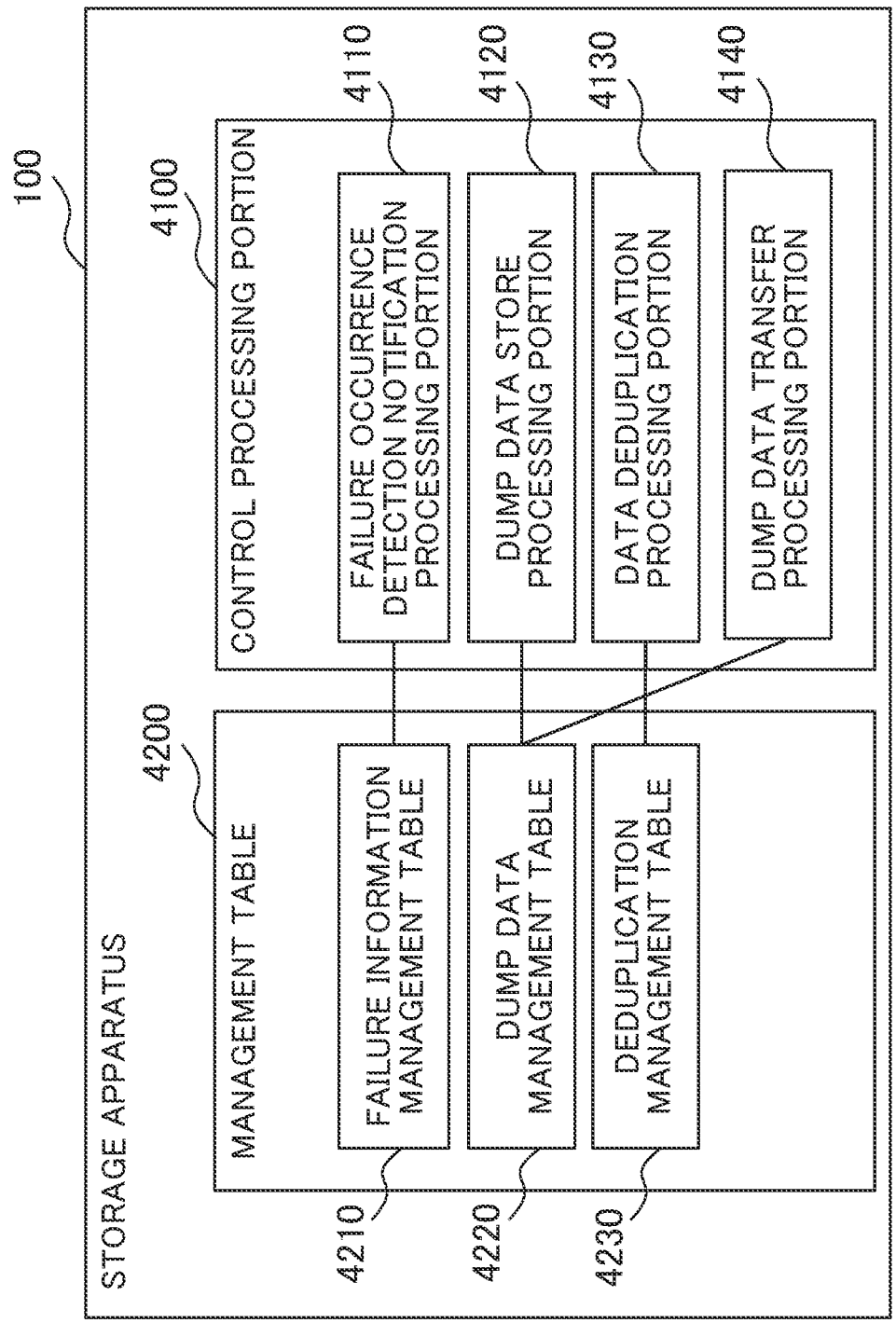
FIG. 6 is a logical configuration of a storage apparatus of one embodiment.

FIG. 6 illustrates a logical configuration of a storage apparatus of one embodiment.

The storage apparatus 100 includes a control portion 4100 and a management table 4200.

The control processing portion 4100 includes a failure occurrence detection notification processing portion 4110, a dump data store processing portion 4120, a data deduplication processing portion 4130, and a dump data transfer processing portion 4140. Here, each portion 4110 to 4140 is configured when the CPU 130 executes a dump data management program stored in the DRAM 140 of the storage apparatus 100.

Upon a failure occurrence of the storage apparatus 100, the failure occurrence detection notification processing portion 4110 detects the failure to notify a maintenance person etc. of the failure occurrence. The failure occurrence detection notification processing portion 4110 stores information about the occurred failure onto a failure information management table 4210.

The dump data store processing portion 4120 executes processing to store, to the logical volume 1100 of the storage apparatus 100, the dump data of memory data of the DRAM 140 upon the failure occurrence of the storage apparatus 100. The dump data store processing portion 4120 stores the information about the dump data onto a dump data management table 4220.

The data deduplication processing portion 4130 deduplicates the dump data of the storage apparatus 100. This deduplication processing allows elimination of duplicate storage of duplicate data in the dump data to reduce a storage area required to store dump data. For example, the deduplication processing includes exclusion of the duplicate data among multiple logical volumes (among multiple dump data) and/or exclusion of the duplicate data within one logical volume (inside one dump data). The data deduplication processing portion 4130 stores, into a deduplication management table 4230, the information about a storage location of the deduplicated data in the logical volume 1100.

The dump data transfer processing portion 4140 identifies the dump data 145 corresponding to the transfer request, acquires each data unit forming the dump data 145 from the deduplication volume 1200, recovers the dump data 145, and then transmits the dump data 145 to a predetermined transfer location.

The management table 4200 includes the failure information management table 4210 that manages the information about the occurred failure, the dump data management table 4220 that manages dump data, and a deduplication management table 4230 that manages deduplication of dump data. The tables 4210 to 4230 in the management table 4200 are stored in the DRAM 140 of the storage apparatus 100 or in the drive 170.

Next, the failure information management table 4210 is explained.

FIG. 7 illustrates an example of a failure information management table of one embodiment.

The failure information management table 4210 stores an entry for each occurred failure. The entry of the failure information management table 4210 includes fields of a failure ID 4211, a failure occurrence date and time 4212, and a failure code 4213.

The failure ID 4211 stores an identification number (failure ID) of a failure corresponding to the entry. The failure ID is uniquely provided to an occurred failure. The failure occurrence date and time 4212 stores the date and time when the failure corresponding to the entry occurs in the storage apparatus 100. The failure code 4213 stores identification information (failure code) about the failure corresponding to the entry. The failure code may be a code to allow the occurred failure to be identified. The failure code may be configured using alphanumeric characters.

Next, the dump data management table 4220 is explained.

FIG. 8 illustrates an example of a dump data management table of one embodiment.

The dump data management table 4220 stores an entry for each dump data. The dump data managed in the dump data management table 4220 may include only dump data acquired upon a failure occurrence or may include dump data acquired regardless of a failure. The entry of the dump data management table 4220 includes fields of a dump data ID 4221, a failure ID 4222, a dump data acquisition date and time 4223, and a storage location logical volume ID 4224.

The identification number (dump data ID) of the dump data corresponding to the entry is stored in the dump data ID 4221. The dump data ID is uniquely provided to the dump data 145 stored in the storage apparatus 100. The failure ID of the failure that is a factor in storing the dump data 145 corresponding to the entry is stored in the failure ID 4222. This the failure ID corresponds to the failure ID of the failure ID 4211 of the entry of the failure information management table 4210 to allow identification of the entry of the corresponding failure in the failure information management table 4210. The failure ID may be "-" when the dump data is acquired regardless of a failure, for example, at the direction of a maintenance person. The dump data acquisition date and time 4223 includes a date and time of acquisition of the dump data 145 corresponding to the entry (specifically, a date and time when the dump data 145 is stored to the dump data storage logical volume 1100: date and time information). The identification number (volume ID) of the dump data storage logical volume 1100 storing the dump data 145 corresponding to the entry is stored to the storage location logical volume ID 4224. This volume ID corresponds to the volume ID of the volume ID 2101 of the logical volume management table 2100.

Next, the deduplication management table 4230 is explained.

FIG. 9 illustrates an example of a deduplication management table of one embodiment.

The deduplication management table 4230 is provided corresponding to each logical volume 1100 in which deduplication processing has been executed. Each deduplication management table 4230 is managed corresponding to the logical volume 1100. For example, the deduplication management table 4230 is managed corresponding to the logical volume ID of the logical volume 1100. Alternatively, the storage location of the deduplication management table 4230 can be identified from the logical volume 1100.

The deduplication management table 4230 stores an entry for each data unit (deduplication unit: for example, data unit 146) to determine deduplication in the logical volumes 1100.

The entry of the deduplication management table 4230 includes fields of a logical data area address 4231, a logical data area size 4232, and a storage location deduplication volume ID 4233.

The logical data area address 4231 stores a starting address of the deduplication unit (data unit 146) corresponding to the entry. The logical data area size 4232 stores a data size of the deduplication unit corresponding to the entry. The storage location deduplication volume ID 4233 stores a volume ID of the volume (deduplication volume 1200) storing the deduplication unit corresponding to the entry.

Next, a processing operation in the storage apparatus 100 is explained.

First, failure occurrence detection notification processing is explained.

Figure 10:
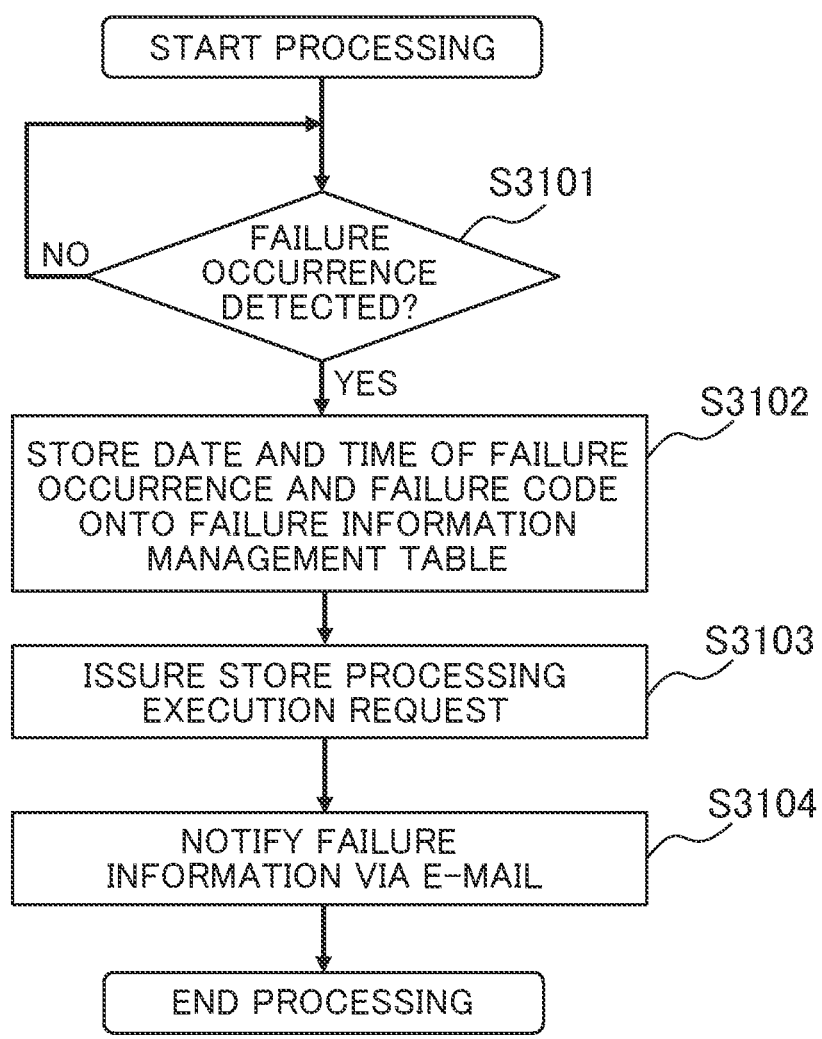
FIG. 10 is a flowchart of failure occurrence detection notification processing of one embodiment.

FIG. 10 is a flowchart of failure occurrence detection notification processing of one embodiment.

The failure occurrence detection notification processing is always executed, for example, during operation of the storage apparatus 100. The failure occurrence detection notification processing portion 4110 determines whether a failure occurrence is detected in the storage apparatus 100 (Step S3101). Here, for example, the failure occurrence detection notification processing portion 4110 or a hardware circuit may detect a failure occurrence. For example, the hardware circuit may identify a failure code of the detected failure.

As a result, when it is determined that no failure occurrence is detected (Step S3101: No), the failure occurrence detection notification processing portion 4110 executes Step S3110 again, for example, after a predetermined time passes. On the other hand, when it is determined that a failure occurrence is detected (Step S3101: Yes), the failure occurrence detection notification processing portion 4110 adds a new entry to the failure information management table 4210, and stores, to the entry, a failure ID of the failure, a date and time of the failure, and a failure code of the occurred failure (Step S3102).

Next, the failure occurrence detection notification processing portion 4110 issues a request for execution of dump data store processing to the dump data store processing portion 4120 (Step S3103). Here, the execution request includes the failure ID of the failure upon which the store operation for the dump data is executed.

Next, the failure occurrence detection notification processing portion 4110 executes a notification of the failure information about the occurred failure (Step S3104). In the present embodiment, the failure occurrence detection notification processing portion 4110 transmits an e-mail to a maintenance person. A method for notification of failure information may include not only an e-mail but also, for example, other notification methods such as a voice call. The failure information to be transmitted may include a date and time of the failure occurrence and a failure code.

In the above failure occurrence detection notification processing, when a failure occurrence is detected, processes at or after Step 3102 are executed to store dump data of memory data of the DRAM 140 upon the failure occurrence. This is not limiting. For example, when a factor of the failure occurrence is unknown, the processes at or after Step S3102 may be executed to store dump data of memory data of the DRAM 140 upon the failure occurrence. The level of detail of the failure information about a failure that may occur in the storage apparatus 100 may be stored to the DRAM 140, for example, in association with a failure code. When the level of detail of the failure information about the failure whose occurrence has been detected is less than a predetermined threshold, the processes at or after Step S3102 may be executed. Then, dump data of memory data of the DRAM 140 upon the failure occurrence may be stored.

Next, the dump data store processing is explained.

Figure 11:
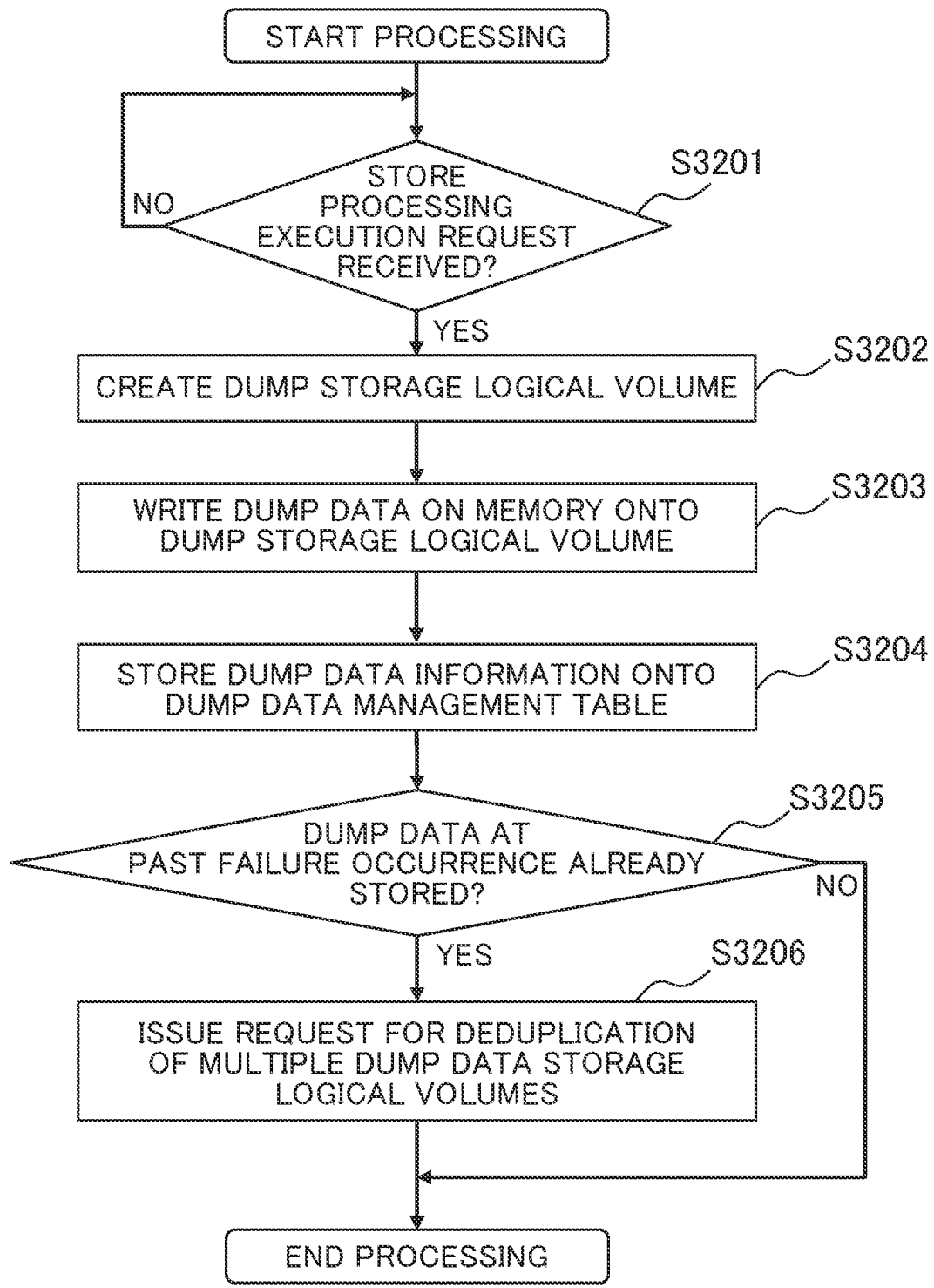
FIG. 11 is a flowchart of dump data store processing of one embodiment.

FIG. 11 is a flowchart of dump data store processing of one embodiment.

The dump data store processing may be always performed, for example, under operation of the storage apparatus 100 or on reception of a request for execution of the dump data store processing from the failure occurrence detection notification processing portion 4110.

The dump data store processing portion 4120 determines whether the request for execution of the dump store processing is received from the failure occurrence detection notification processing portion 4110 (Step S3201).

As a result, when it is determined that the execution request for the dump data store processing is not received (Step S3201: No), the dump data store processing portion 4120 executes Step S3201 again, for example, after a predetermined time passes. On the other hand, when it is determined that the execution request for the dump data store processing is received (Step S3201: Yes), the dump data store processing portion 4120 creates the logical volume 1100 (dump storage logical volume) that is a storage location of the dump data (Step S3202). Here, an existing logical volume creation function of the storage apparatus 100 may be requested to create the logical volume 1100. However, the dump data store processing portion 4120 needs to store the volume ID of the created logical volume 1100. The volume capacity of the logical volume 1100 to be created has a size where all data of dump data is storable (for example, the size of the DRAM 140 to be dumped).

Next, the dump data store processing portion 4120 reads the memory data 144 of the area to be dumped on the DRAM 140 and writes the memory data 144 onto the logical volume 1100 created at Step S3202 (Step S3203).

Next, the dump data store processing portion 4120 adds, to the dump data management table 4220, an entry corresponding to the dump data to be stored. The dump data store processing portion 4120 stores, to the entry, a dump data ID provided to this dump data, a failure ID included in the execution request, a dump data acquisition date and time, and a logical volume ID (storage location logical volume ID) of the logical volume storing the dump data (Step S3204).

Next, the dump data store processing portion 4120 determines whether the dump data upon a past failure occurrence is already stored in reference to the dump data management table 4220 (Step S3205).

As a result, when the dump data upon the past failure occurrence is not stored (Step S3205: No), the dump data store processing portion 4120 ends processing.

On the other hand, when the dump data upon the past failure occurrence has been already stored (Step S3205: Yes), the dump data store processing portion 4120 requests the data deduplication processing portion 4130 for deduplication processing between the store target dump data and the dump data upon the past failure stored in the logical volume 1100 for dump data storage (Step S3206) and ends the processing. The deduplication method in the deduplication processing may use a well known method. Detailed explanation of the deduplication processing is omitted in this specification. The deduplication management table 4230 corresponding to the logical volume 1100 for the dump data to be stored is created through the deduplication processing by the data deduplication processing portion 4130.

The above processing determines whether the dump data upon the past failure occurrence has been already stored at Step S3205. This is not limiting. It may be determined whether the past dump data is stored at times other than upon a failure occurrence. In this case, at Step S3206, deduplication processing may be executed between the dump data to be stored and the past dump data.

At Step S3206 of the above processing, before or after execution of deduplication processing, compression processing may be executed to the dump data 145.

When the dump data 145 upon the past failure occurrence is not stored at Step S3205 (Step S3205: No), deduplication processing is not executed. When duplicate data are present between the data areas in the dump data 145 to be stored, data reduction using deduplication processing is expectable. The data deduplication processing portion 4140 may be requested to execute deduplication processing within the dump data 145 to be stored.

Simultaneously, at Step S3206, the data deduplication portion 4140 may be requested to execute deduplication processing within the dump data 145 to be stored.

Next, dump data transfer processing is explained.

Figure 12:
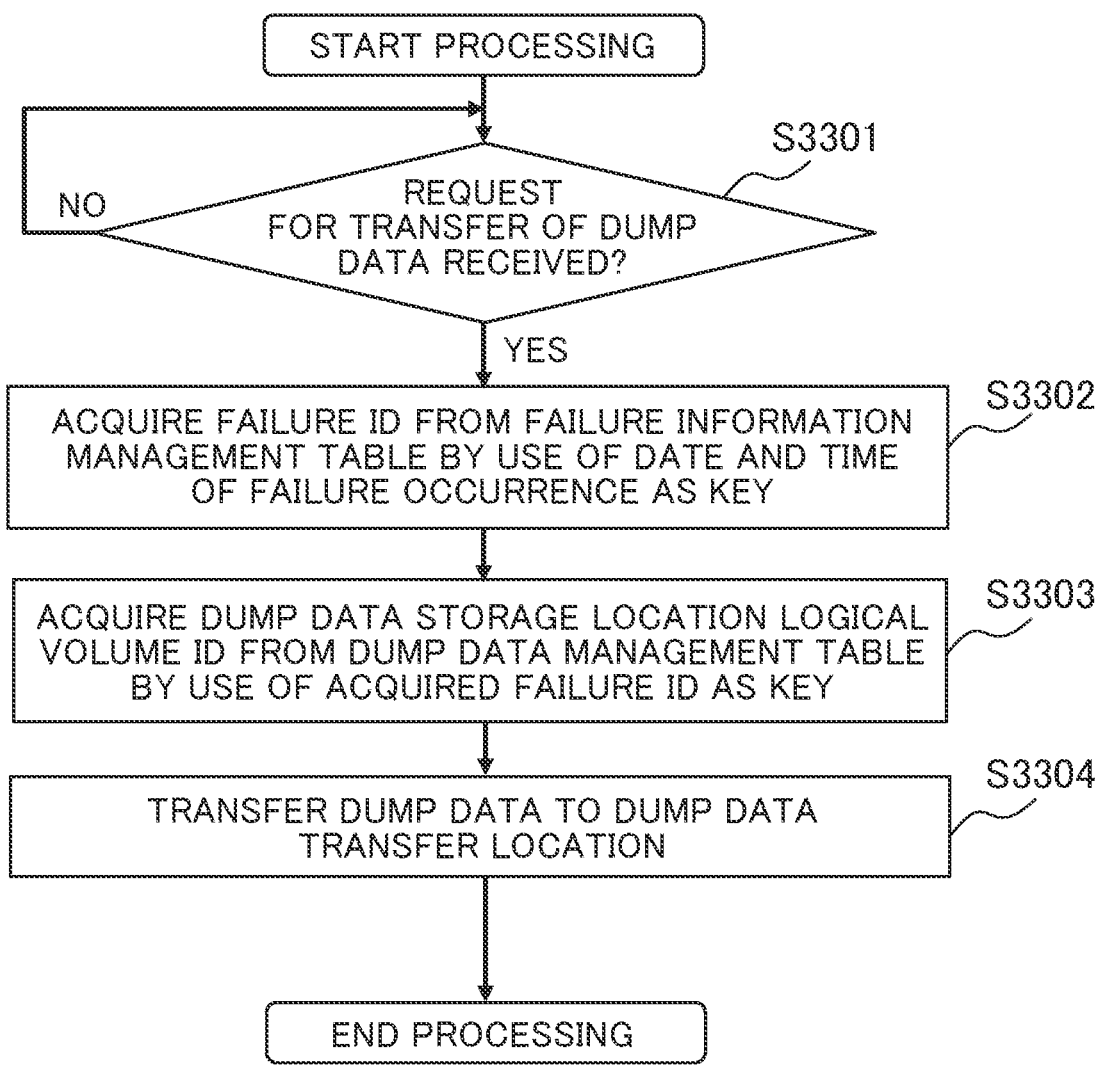
FIG. 12 is a flowchart of dump data transfer processing of one embodiment.

FIG. 12 is a flowchart of dump data transfer processing of one embodiment.

The dump data transfer processing portion 4140 determines whether a dump data transfer request is received, for example, from a maintenance person (Step S3301). Here, the dump data transfer request includes a date and time of the failure occurrence corresponding to the dump data 145 to be transferred and a transfer location of the dump data. The management device 300 connected to the storage apparatus 100 may be a transfer location of the dump data. The dump data transfer request may be executed by the management device 300 connected to the storage apparatus 100 based on an operational input of the maintenance person. When a management processor (including an input device) is incorporated in the storage apparatus 100, the dump data transfer request may be executed by the management processor based on an operational input of the maintenance person.

As a result, when it is determined that the dump data transfer request is not received (Step S3301: No), the dump data transfer processing portion 4140 executes Step S3301 again, for example, after a predetermined time passes. On the other hand, when it is determined that the dump data transfer request is received (Step S3301: Yes), the dump data transfer processing portion 4140 identifies and acquires the failure ID corresponding to the date and time of the failure occurrence contained in the dump data transfer request in reference to the failure information management table 4210 (Step S3302).

Next, by using the acquired failure ID as a key, the dump data transfer processing portion 4140 acquires the dump data storage location logical volume ID corresponding to the failure ID from the dump data management table 4220 (Step S3303).

Next, the dump data transfer processing portion 4140 transmits data in the logical volume corresponding to the acquired dump data storage location logical volume ID to the dump data transfer location contained in the dump data transfer request (Step S3304). At Step S3304, when transferring the data from the storage logical volume 1100 storing the deduplicated dump data to the dump data transfer location, the dump data transfer processing portion 4140 may recover the deduplicated data (or compressed and deduplicated data) to the dump data 145 once, which is an original form, and store the recovered data into the drive 170, DRAM 140, or cache memory 120 of the storage apparatus 100. Then, the dump data transfer processing portion 4140 may transfer the recovered data to the transfer location. While recovering the deduplicated data (or compressed and deduplicated data) to the dump data 145 that is an original form, the dump data transfer processing portion 4140 may sequentially transfer the recovered data to the transfer location.

The dump data transfer processing portion 4140 may transfer deduplicated data (or compressed deduplicated data) and deduplication management information (for example, the deduplication management table: deduplication management information and compression management information (information about relationship between compressed data and original data) when compression processing is executed) to the transfer location.

Then, the dump data transfer processing portion 4140 may recover the dump data by using the data deduplicated by a device at the transfer location (or compressed and deduplicated data) and the deduplication management information (or the deduplication management information and compression management information).

This dump data transfer processing allows desired dump data to be appropriately transmitted to a transmission location.

The dump data transfer at Step S3304 may use a dedicated interface and a dedicated network line provided for dump data transfer or the network 400 and host I/F 110.

In the above processing, the information that identifies the dump data to be transferred in response to the dump data transfer request includes a date and time of a failure occurrence. This does not limit the present invention. For example, the information may include any of the dump data ID, dump data acquisition date and time, and failure ID.

As explained above, in the storage system of the present embodiment, storage processing is executed to store data of the DRAM 140 to be stored to the drive 170 as dump data upon a failure occurrence in the storage apparatus 100. In the storage processing or after the dump data is stored to the drive 170, the dump data is deduplicated. The data capacity used for storage of dump data is reduceable in the drive 170.

The present invention is not limited to the above embodiment. The present invention can be properly modified and carried out without departing from the meaning of the present invention.

For example, in the above embodiment, the storage apparatus is realized by mounting software in the general purpose computer. This does not limit the present invention. The storage apparatus may be configured by dedicated hardware or realized by executing software in dedicated hardware.

The above embodiment describes the example using the post process method as the deduplication processing method. This does not limit the present invention. For example, a different deduplication processing method such as the in-line method or a combination of the in-line method and post-process method may be used. Here, the post-process method is a method that executes deduplication processing to data asynchronously written to a storage device after data is written to the storage device, the in-line method is a method that executes deduplication processing to data before data is written to a storage device.

What is claimed is:

1. A storage apparatus, comprising:
a processor;
a plurality of logical volumes;

a plurality of storages storing deduplication data which includes a plurality of previously stored data dumps each including a plurality of data chunks;

a Dynamic Random Access Memory (DRAM) coupled to the processor having dump data;

wherein the processor is programmed to:

upon failure of software or hardware of the storage apparatus, write dump data from the DRAM to a first logical volume of the plurality of logical volumes, the dump data including a first data chunk and a second data chunk, determine whether at least one of the first data chunk and the second data chunk are redundant based on the plurality of data chunks of the previously stored dump data stored in the logical units, upon determining at least one of the first data chunk and the second data chunk are not redundant store the non-redundant first data chunk or the non-redundant second data among the storage areas, upon determining at least one of the first data chunk and the second data chunk are redundant, map, and not store the first data chunk or second data chunk determined to be redundant to the storage area already storing the redundant data chunk among the first data chunk and the second data chunk, and thereafter, notify an external terminal of the failure occurrence and transmit information to the external terminal including the time of the failure occurrence and a failure code indicating the occurred failure.

2. The storage apparatus according to claim 1, wherein the processor is programmed to determine whether the at least one of the first data chunk and the second data chunk are redundant based on the plurality of data chunks of the previously stored dump data stored in the logical units regardless of whether a failure identification has been determined.

3. The storage apparatus according to claim 1 further comprising a memory that stores a level of detail of failure information about a failure that may occur in the storage device, and the processor is programmed to determine whether a level of the failure occurrence is less than a predetermined threshold.

4. The storage apparatus according to claim 1, wherein the processor portion stores deduplication management information indicating a storage location of duplicate data in the deduplication processing, and transmits a plurality of deduplicated dump data and the deduplication management information when receiving a request for transfer of multiple dump data.

5. A method for managing dump data by a storage apparatus including a processor, a plurality of logical volumes, a plurality of storage areas storing deduplication data which includes a plurality of previously stored data dumps each including a plurality of data chunks, a Dynamic Random Access Memory (DRAM) coupled to the processor having dump data, the method comprising:

upon failure of software or hardware of the storage apparatus, writing dump data from the DRAM to a first logical volume of the plurality of logical volumes, the dump data including a first data chunk and a second data chunk;

determining whether at least one of the first data chunk and the second data chunk are redundant based on the plurality of data chunks of the previously stored dump data stored in the logical units;

upon determining at least one of the first data chunk and the second data chunk are not redundant storing the non-redundant first data chunk or the non-redundant second data among the storage areas;

upon determining at least one of the first data chunk and the second data chunk are redundant, map, not storing the first data chunk or second data chunk determined to be redundant to the storage area already storing the redundant data chunk among the first data chunk and the second data chunk; and thereafter, notifying an external terminal of the failure occurrence and transmit information to the external terminal including the time of the failure occurrence and a failure code indicating the occurred failure.

6. A dump data management program stored on a non-transitory computer readable medium executed by a computer forming a storage apparatus including a processor a plurality of logical volumes, a plurality of storage areas storing deduplication data which includes a plurality of previously stored data dumps each including a plurality of data chunks, a Dynamic Random Access Memory (DRAM) coupled to the processor having dump data, the program causing the computer to execute:

upon failure of software or hardware of the storage apparatus, write dump data from the DRAM to a first logical volume of the plurality of logical volumes, the dump data including a first data chunk and a second data chunk, determine whether at least one of the first data chunk and the second data chunk are redundant based on the plurality of data chunks of the previously stored dump data stored in the logical units, upon determining at least one of the first data chunk and the second data chunk are not redundant store the non-redundant first data chunk or the non-redundant second data among the storage areas, upon determining at least one of the first data chunk and the second data chunk are redundant, map, and not store the first data chunk or second data chunk determined to be redundant to the storage area already storing the redundant data chunk among the first data chunk and the second data chunk, and thereafter, notify an external terminal of the failure occurrence and transmit information to the external terminal including the time of the failure occurrence and a failure code indicating the occurred failure.

* * * * *